United States Patent [19]
Benazzi et al.

[11] Patent Number: 6,153,548
[45] Date of Patent: Nov. 28, 2000

[54] NU-85 ZEOLITE CATALYST AND A PROCESS FOR IMPROVING THE POUR POINT OF FEEDS CONTAINING PARAFFINS

[75] Inventors: Eric Benazzi, Chatou; Nathalie George-Marchal, Paris; Christophe Gueret; Patrick Briot, both of Vienne; Alain Billon, Le Vesinet; Pierre Marion, Paris, all of France

[73] Assignee: Institut Francais du Petrole

[21] Appl. No.: 09/104,362

[22] Filed: Jun. 25, 1998

[30] Foreign Application Priority Data

Jun. 25, 1997 [FR] France ................................. 97 07930

[51] Int. Cl.⁷ ................................ B01J 29/74; C07C 5/22
[52] U.S. Cl. ................................ 502/63; 502/66; 502/74; 502/85; 208/134; 585/739
[58] Field of Search .......................... 423/713, 714, 423/715; 502/63, 66, 74, 85; 208/134; 585/739

[56] References Cited

U.S. PATENT DOCUMENTS

| | | |
|---|---|---|
| 4,273,753 | 6/1981 | Chang . |
| 4,503,023 | 3/1985 | Breck et al. . |
| 4,537,754 | 8/1985 | Casci et al. . |
| 4,593,138 | 6/1986 | Casci et al. . |
| 4,711,770 | 12/1987 | Skeels et al. . |
| 4,836,911 | 6/1989 | Skeels et al. . |
| 4,954,243 | 9/1990 | Kuehl et al. . |
| 5,242,676 | 9/1993 | Apelian et al. ........................ 423/714 |
| 5,310,534 | 5/1994 | Fajula et al. . |
| 5,874,621 | 2/1999 | Eller et al. ........................ 564/445 |

FOREIGN PATENT DOCUMENTS

| | | |
|---|---|---|
| 142313 | 11/1984 | European Pat. Off. . |
| 190949 | 8/1986 | European Pat. Off. . |
| 431448 | 11/1990 | European Pat. Off. . |
| 462745 | 6/1991 | European Pat. Off. . |
| 488867 | 11/1991 | European Pat. Off. . |
| 93/02994 | 2/1993 | WIPO . |

OTHER PUBLICATIONS

Abstract of JP 61 201 618, Sep. 1986.

*Primary Examiner*—Mark L. Bell
*Assistant Examiner*—David Sample
*Attorney, Agent, or Firm*—Millen, White, Zelano & Branigan, P.C.

[57] ABSTRACT

The invention concerns a process for improving the pour point of a feed comprising paraffins containing more than 10 carbon atoms, in which process the feed to be treated is brought into contact with a catalyst comprising NU-85 zeolite and at least one hydro-dehydrogenating element, at a temperature which is in the range 170° C. to 500° C., a pressure in the range 1 to 250 bar and an hourly space velocity in the range 0.05 to 100 h⁻¹, in the presence of hydrogen in a proportion of 50 to 2000 l/l of feed. The oils obtained have good pour points and high viscosity indices (VI). The process is also applicable to gas oils and other feeds requiring a reduction of pour point. The invention also concerns a NU-85 zeolite from which a portion of elements T (Al, Ga, Fe or B) have been removed and which has an Si/T atomic ratio of at least 18.

17 Claims, No Drawings

NU-85 ZEOLITE CATALYST AND A PROCESS FOR IMPROVING THE POUR POINT OF FEEDS CONTAINING PARAFFINS

BACKGROUND OF THE INVENTION

The present invention concerns a process for improving the pour point of feeds containing linear and/or slightly branched, long (more than 10 carbon atoms) paraffins, to provide good yields on converting feeds with high pour points to at least one cut with a low pour point and a high viscosity index for oil bases.

The present invention also concerns a NU-85 zeolite from which a portion of the elements Al, Fe, Ga or B has been removed, for example dealuminated, a catalyst containing that zeolite, its use in converting hydrocarbons, and a process for reducing the pour point using that catalyst.

High quality lubricants are fundamentally important for the proper operation of modern machines, automobiles and trucks. However, the quantity of paraffins originating directly from untreated crude oil with properties which are suitable for use in good lubricants is very low with respect to the increasing demand in this sector.

Heavy oil fractions containing large amounts of linear or slightly branched paraffins must be treated in order to obtain good quality oil bases in the best possible yields, using an operation which aims to eliminate the linear or slightly branched paraffins from feeds which are then used as base stock, or as kerosene or jet fuel.

High molecular weight paraffins which are linear of very slightly branched which are present in the oils or kerosene or jet fuel result in high pour points and thus in coagulation for low temperature applications. In order to reduce the pour points, such linear paraffins which are not or are only slightly branched must be completely or partially eliminated.

This operation can be carried out by extracting with solvents such as propane or methyl ethyl ketone, termed dewaxing, with propane or methyl ethyl ketone (MEK). However, such techniques are expensive, lengthy and not always easy to carry out.

A further technique is selective cracking of the longest linear paraffin chains to form compounds with a lower molecular weight, part of which can be eliminated by distillation.

Because of their form selectively, zeolites are among the most widely used catalysts. The idea underlying their use is that zeolitic structures exist which have pore openings which allow long linear or very slightly branched paraffins to enter their micropores but which exclude branched paraffins, naphthenes and aromatic compounds. This phenomenon leads to selective cracking of linear or very slightly branched paraffins.

Zeolite based catalysts with intermediate pore sizes such as ZSM-5, ZSM-11, ZSM-12, ZSM-22, ZSM-23, ZSM-35 and ZSM-38 have been described for their use in such processes.

Further, processes using some of such zeolites (ZSM-5, ZSM-11, ZSM-12, ZSM-22, ZSM-23, ZSM-35 and ZSM-38) can produce oils by cracking feeds containing less than 50% by weight of linear or linear or very slightly branched paraffins. However, for feeds containing higher quantities of these compounds, it has become apparent that cracking them leads to the formation of large quantities of products with lower molecular weights such as butane, propane, ethane and methane, which considerably reduces the yield of desired products.

SUMMARY OF THE INVENTION

In order to overcome these disadvantages, we have concentrated our research on developing catalysts based on NU-85 zeolites which also encourage isomerisation of such compounds.

The present invention proposes a pour point reduction process based on NU-85 zeolite.

AIM OF THE INVENTION

The invention provides a process for improving the pour point of a paraffinic feed comprising paraffins containing more than 10 carbon atoms, in which process the feed to be treated is brought into contact with a catalyst based on NU-85 zeolite and at least one hydro-dehydrogenating element, at a temperature which is in the range 170° C. to 500° C., a pressure in the range 1 to 250 bar and an hourly space velocity in the range 0.05 to 100 $h^{-1}$, in the presence of hydrogen in a proportion of 50 to 2000 l/l of feed.

NU-85 in its hydrogen form, termed H-NU-85, obtained by calcining and/or ion exchanging as synthesized NU-85, used in the process of the invention, and its synthesis are described in European patent EP-A2 0 462 745. This NU-85 is a hybrid of EU-1 and NU-87 zeolites.

The composition of this NU-85 zeolite, expressed as its anhydrous form, in terms of molar ratios of the oxides, has the following formula:

$100XO_2$:10 or less $Y_2O_3$:20 or less $R_{2/n}O$ where R represents one or more cations with valency n, X represents silicon and/or germanium, Y represents one or more of the following: aluminium, iron, gallium, boron, titanium, vanadium, zirconium, molybdenum, arsenic, antimony, chromium or manganese, preferably Al, Fe, Ga, B (elements T).

This NU-85 zeolite comprises crystals with an X ray diffraction diagram which has the characteristic lines of EU-1 and NU-87 zeolites and these peaks have between them a continuity and are characteristic of a continuous crystalline framework.

In its as synthesized state, i.e., prepared by synthesis, this NU-85 zeolite also comprises network images (obtained using a transmission electron microscope) which, in the orientation producing 20±0.2 Å fringes for EU-1-zeolite, exhibits intermediate fringes of 12.5±0.2 Å in association with those fringes of 20±0.2 Å, and/or an X ray diffraction diagram containing the lines shown in the following table:

| d (Å) | Relative intensity |
|---|---|
| 11.15 ± 0.20 | m |
| 10.30 ± 0.20 | w |
| 6.89 ± 0.12 | w |
| 4.66 ± 0.10 | m |
| 4.31 + 0.10 | vs |
| 4.00 ± 0.08 | s to vs |
| 3.86 ± 0.08 | w to m |
| 3.71 ± 0.07 | m |
| 3.42 ± 0.07 | w to m |
| 3.37 ± 0.06 | w to m |
| 3.26 ± 0.06 | s to vs |
| 3.16 ± 0.06 | w |
| 3.10 ± 0.06 | w |
| 2.96 ± 0.05 | w |
| 2.71 ± 0.05 | w |

| d (Å) | Relative intensity |
|---|---|
| -continued | | w (weak) corresponds to a value of less than 20, m (medium) corresponds to a value in the range 20 to 40, s (strong) corresponds to a value of over 40 and below 60, vs (very strong) corresponds to a value of over 60.

The term "NU-85 zeolite" encompasses a family of products in which the NU-87 and EU-1 contents can vary substantially depending on the conditions selected to synthesis the NU-85 zeolite. Thus, and as is well known to the skilled person, the intensity of these lines can vary depending on the form of the zeolite, without raising doubts as to whether that zeolite belongs to the NU-85 family.

The process can advantageously convert a feed with a high pour point to a product with a lower pour point. It can be applied to reducing the pour point of gas oils, for example. It can also be used to convert heavier feeds to oils with a high viscosity index.

Among others, the feed is composed of linear and/or slightly branched paraffins containing at least 10 carbon atoms, preferably 15 to 20 carbon atoms, and advantageously 15 to 40 carbon atoms. Heavy feeds (to produce oils) contain paraffins essentially containing more than 30 carbon atoms; gas oils contain paraffins containing 10–30 carbon atoms.

The isomerized products present in the final products may contain about 65% to 80% of single-branched products and about 20% to 35% of multi-branched products. The term "single-branched products" means linear paraffins comprising a single methyl group, and the term "two-branched products" means linear paraffins containing 2 methyl groups which are not carried by the same carbon atom. Thus "multi-branched" paraffins can be defined by extension.

Further, the catalyst comprises at least one hydrodehydrogenating function, for example a group VIII metal (noble or non-noble) or a combination of at least one group VIII (non noble) metal or compound and at least one group VI metal or compound, and the reaction is carried out under conditions which will be described below.

Using the NU-85 zeolite of the invention under the conditions described above can produce products with a low pour point in good yields, with a high viscosity index for oils.

DETAILED DESCRIPTION OF THE INVENTION

NU-85 zeolite has an Si/T atomic ratio in the range 5 to 600 and in particular in the range 10 to 300.

The global Si/T ratio of the zeolite and the chemical composition of the samples are determined by X ray fluorescence and atomic absorption.

The NU-85 zeolite used in the process of the invention can be obtained with the desired Si/T ratio for the catalytic application of the invention directly by synthesis by adjusting the operating conditions for synthesis. Then the zeolite is calcined and exchanged by at least one treatment using a solution of at least one ammonium salt to obtain the ammonium form of the zeolite which, once calcined, leads to the hydrogen form of the zeolite.

Advantageously, in other cases the NU-85 zeolite has undergone a treatment aimed at eliminating (removing) a portion of elements T, for example aluminium (in which case it is dealumination) so as to increase the low Si/T ratio obtained on synthesis. The global Si/T ratio is at least 18, preferably at least 20, or better at least 22 or even over 30, and generally NU-85 zeolites are used with Si/Al ratio of at most 600, preferably at most 300, or even at most 150.

This zeolite is obtained from as synthesized zeolite and thus contains silicon and an element T selected from the group formed by Al, Fe, Ga and B. A portion of elements T have been removed from the zeolite framework and advantageously they are extracted from the sample (they then pass into solution in the case of acid attack). In this advantageous case, the global Si/T atomic ratio of the zeolite is greater than that of the starting zeolite, the difference (increase) is at least equal to 10% of the Si/T ratio of the starting zeolite. The surface Si/T atomic ratio (obtained by XPS) does not diminish, and advantageously it increases.

The zeolite constitutes a further aspect of the invention.

The dealuminated NU-85 zeolite of the invention, in the preferred case where T is Al, can be prepared using two dealumination methods from as synthesised NU-85 zeolite containing an organic structuring agent. These methods are described below. However, any other method which is known to the skilled person can also be used. These methods described for Al can also be used for other elements T.

The first (preferred) method, direct acid attack, comprising a first calcining step carried out in dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more optional ion exchange steps can be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

Dealumination can also be achieved using chemical dealuminating agents such as (by way of non exhausting examples) silicon tetrachloride ($SiCl_4$), ammonium hexafluorosilicate [$(NH_4)_2SiF_6$], ethylenediaminetetraacetic acid (EDTA) and its mono and disodium forms. These reactants can be used in solution of in the gaseous phase, for example in the case of $SiCl_4$.

The second method, heat treatment (in particular using steam, by steaming)+acid attack, comprises firstly calcining in dry air at a temperature which is generally in the range 450° C. to 550° C., to eliminate the organic structuring agent occluded in the micropores of the zeolite. The solid obtained then undergoes one or more ion exchanges using at least one $NH_4NO_3$ solution, to eliminate at least a portion, preferably practically all of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 500°

C. to 900° C., and optionally followed by at least one acid attack using an aqueous solution of a mineral or organic acid as defined above. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment—acid attach cycles can be varied.

In a variation of this second method, the acid attack step, i.e., treatment using a solution of an acid, can be replaced by treatment with a solution of a chemical dealuminating compound such as those cited above, for example, namely silicon tetrachloride ($SiCl_4$), ammonium hexafluorosilicate [$(NH_4)_2SiF_6$], ethylenediaminetetraacetic acid (EDTA) and its mono and disodium forms.

In the preferred case when T is Al, the framework dealumination cycle, comprising at least one heat treatment step, optionally and preferably carried out in the presence of steam, and at least one attack step carried out in an acid medium of the NU-85 zeolite, can be repeated as often as is necessary to obtain the dealuminated NU-85 zeolite having the desired characteristics. Similarly, following the heat treatment, optionally and preferably carried out in the presence of steam, a number of successive acid attacks can be carried out using different acid concentrations.

In a variation of this second calcining method, heat treatment of the NU-85 zeolite containing the organic structuring agent can be carried out at a temperature which is generally in the range 500° C. to 850° C., optionally and preferably in the presence of steam. In this case, the steps of calcining the organic structuring agent and dealumination of the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally undergo at least one ion exchange step using at least one $NH_4NO_3$ solution, to eliminate practically all of the alkaline cations, in particular sodium, present in the cationic position in the zeolite.

The NU-85 zeolite of the invention is at least partially, preferably practically completely, in its acid form, i.e., in its hydrogen ($H^+$) form. The Na/T atomic ratio is generally less than 10%, preferably less than 5%, and more preferably less than 1%.

The catalyst of the invention contains NU-85 zeolite with an Si/T ratio of at least 18, which may or may not be mixed with a matrix, and optionally at least one hydro-dehydrogenating element, which is a noble metal or a combination of at least one group VI metal or compound and at least one group VIII metal or compound.

The catalyst used in the process of the invention generally contains at least one hydro-dehydrogenating element, for example at least one group VIII element, preferably a noble metal, advantageously selected from the group formed by Pt or Pd, which is introduced into the molecular sieve by dry impregnation or ion exchange, for example, or by any other method which is known to the skilled person, or it is introduced into the matrix.

The amount of metal thus introduced, expressed as weight % with respect to the mass of molecular sieve engaged, is generally less than 5%, preferably less than 3%, and the amount of noble metal in the catalyst is generally less than 2% by weight.

The hydro-dehydrogenating element can also be a combination of at least one group VI metal or compound (for example molybdenum or tungsten) and at least one group VIII metal or compound (for example nickel or cobalt). The total concentration of group VI and group VIII metals, expressed as the metal oxides with respect to the support, is generally in the range 5% to 40% by weight, preferably in the range 7% to 30% by weight. The weight ratio (expressed as the metallic oxides) of group VIII metals to group VI metals is preferably in the range 0.05 to 0.8: more preferably in the range of 0.13 to 0.5.

The element can also be rhenium and/or niobium, used alone or in combination with the group VIII and/or VI elements.

This type of catalyst can advantageously contain phosphorous, the content of which is generally less than 15% by weight, preferably less than 10% by weight, expressed as phosphorous oxide $P_2O_5$ with respect to the support.

When treating a real feed, the molecular sieve of the invention is first formed. In a first variation, the molecular sieve can have at least one hydro-dehydrogenating element deposited on it, and it can be formed by any technique which is known to the skilled person. In particular, it can be mixed with a matrix, which is generally amorphous, for example a moist alumina gel powder. The mixture is then formed, for example by extrusion through a die. The amount of molecular sieve in the mixture obtained is generally in the range 0.5% to 99.9%, advantageously in the range of 5% to 90% by weight, with respect to the mixture (molecular sieve+matrix) and preferably in the range 10% to 90%, more preferably in the range 20% to 70%.

In the remaining test, the term "support" is used to described the molecular sieve+matrix mixture.

Forming can be carried out with matrices other than alumina, such as magnesia, amorphous silica-aluminas, natural clays (kaolin, bentonite, sepiolite, attapulgite), silica, titanium oxide, boron oxide, zirconia, aluminium phosphates, titanium phosphates, zirconium phosphates, coal and mixtures thereof. Techniques other than extrusion, such as pelletization or bowl granulation, can be used.

The group VIII hydrogenating metal, preferably Pt and/or Pd, can also be deposited on the support using any process which is known to the skilled person which can deposit metal on the molecular sieve. Competitive cation exchange can be used, with ammonium nitrate as the preferred competitor, the competition ratio being at least about 20 and advantageously about 30 to 200. When platinum or palladium is used, a platinum tetramine complex or a palladium tetramine complex is normally used: these latter are almost completely deposited on the molecular sieve. This cation exchange technique can also be used to deposit the metal directly on powdered molecular sieve before mixing it with any matrix.

Deposition of the group VIII metal(s) is generally followed by calcining in air or oxygen, usually between 300° C. and 600° C. for 0.5 to 10 hours, preferably between 350° C. and 550° C. for 1 to 4 hours. Reduction in hydrogen can then follow, generally at a temperature which is in the range 300° C. to 600° C. for 1 to 10 hours, preferably in the range 350° C. to 550° C. for 2 to 5 hours.

The platinum and/or palladium can also be deposited not directly on the molecular sieve, but on the matrix (alumina binder) before or after forming, by anion exchange with hexachloroplatinic acid, hexachloropalladic acid and/or palladium chloride in the presence of a competing agent, for example hydrochloric acid. As before, after depositing the platinum and/or palladium, the catalyst is generally calcined then reduced in hydrogen as indicated above.

The non noble group VIII metals or an association of oxides of non noble group VI and VIII metals, comprising the hydro-dehydrogenating function, can be introduced into the catalyst at various stages of the preparation and in various fashions.

It can be introduced only in part (for association of group VI and VIII metals) or completely on mixing the molecular sieve of the invention with the gel of the oxide selected as the matrix. It can be introduced using one or more ion exchange operations on the calcined support constituted by the molecular sieve of the invention dispersed in the selected matrix, using solutions containing the precursors salts of the selected metals when these belong to group VIII. They may be introduced by one or more impregnation operations carried out on the formed and calcined support, using a solution of precursors of oxides of metals from group VIII (in particular cobalt or nickel) when the precursors of oxides of metals from group VI (in particular molybdenum or tungsten) have first been introduced on mixing the support. Finally, it can be introduced by one or more impregnation operations carried out on the calcined support constituted by a molecular sieve of the invention and the matrix, using solutions containing the precursors of the oxides of metals from groups VI and/or VIII, the precursors of oxides from group VIII metals preferably being introduced after those of group VI or at the same time as the latter.

When the metal oxides are introduced in a plurality of impregnation steps using the corresponding precursor salts, an intermediate calcining step must be carried out at a temperature in the range of 250° C. to 600° C.

Molybdenum impregnation can be facilitated by adding phosphoric acid to the ammonium paramolybdate solutions.

The mixture is then formed, for example by extrusion through a die. The amount of molecular sieve in the mixture obtained is generally in the range 0.5% to 99.9%, advantageously in the range 10% to 90% by weight with respect to the mixture (molecular sieve+matrix), preferably in the range 20% to 70%.

Deposit of the final metal is generally followed by calcining in air or in oxygen, usually between 300° C. and 600° C. for 0.5 to 10 hours, preferably between 350° C. and 550° C. for 1 to 4 hours.

It is then generally followed by sulphuration of the catalyst before brining it into contact with the feed, using any method known to the skilled person. Thus in this case the catalyst advantageously contains sulphur.

The catalyst of the invention is used to convert hydrocarbons, in particular to reduce the pour point as will be defined below.

The process for reducing the pour point as defined below can also be carried out using a catalyst containing a NU-85 zeolite, obtained by synthesis, with the formula described above, in particular with a Si/T ratio of 5 to 600, advantageously 10 to 300. Zeolites with Si/T ratios of less than 20 are thus included.

Feeds which can be treated using the process of the invention are advantageously fractions with relatively high pour points which are to be reduced.

The process of the invention can be used to treat a variety of feeds from relatively light fractions, such as kerosenes, and jet fuels, to feeds with higher boiling points such as middle distillates, vacuum residues, gas oils, middle distillates from FCC (LCO and HCO) and hydrocracking residues.

The feed to be treated is, for the most part, a $C_{10}^+$ cut with an initial boiling point of more than about 175° C., preferably a heavy cut with a boiling point of at least 280° C., advantageously a boiling point of at least 380° C. The process of the invention is particularly suitable for treating paraffinic distillates such as middle distillates which encompass gas oils, kerosines, jet fuels, vacuum distillates and all other fractions with a pour point and viscosity which must be adapted to satisfy specifications.

Feeds which can be treated using the process of the invention can contain paraffins, olefins, naphthenes, aromatics and heterocycles and have a high proportion of high molecular weight n-paraffins and very slightly branched paraffins, also of high molecular weight.

The reaction is carried out so that the cracking reactions remain sufficiently low to render the process economically viable. The amount of cracking reactions is generally below 40% by weight, preferably below 30%, and advantageously below 20%.

Typical feeds which can advantageously be treated by the process of the invention generally have a pour point of more than 0° C. The products resulting from treatment in accordance with the process have pour points of below 0° C., preferably below about –10° C.

These feeds contain amounts of n-paraffins and very slightly branched paraffins containing more than 10 carbon atoms, also with high molecular weight, of over 30% and up to about 90%, and in some cases more than 90% by weight. The process is of particular interest when this proportion is at least 60% by weight.

Non limiting examples of other feeds which can be treated in accordance with the invention are bases for lubricating oils, synthesized paraffins from the Fischer-Tropsch process, high pour point polyalphaolefins, synthesised oils, etc. . . . The process can also be applied to other compounds containing an n-alkane chain such as those defined above, for example n-alkylcycloalkanes, or containing at least one aromatic group.

The process is carried out under the following operating conditions:

the reaction temperature is in the range 170° C. to 500° C., preferably in the range 180° C. to 470° C., advantageously 190° C. to 450° C.;

the pressure is in the range 1 to 250 bar, preferably in the range 10 to 200 bar;

the hourly space velocity (HSV expressed as the volume of feed injected per unit volume of catalyst per hour) is in the range about 0.05 to about 100, preferably about 0.1 to about 30 $h^{-1}$.

The feed and the catalyst are brought into contact in the presence of hydrogen. The amount of hydrogen used, expressed in liters of hydrogen per liter of feed, is in the range 50 to about 2000 liters of hydrogen per liter of feed, preferably in the range 100 to 1500 liters of hydrogen per liter of feed.

The quantity of nitrogen compounds in the feed to be treated is preferably less than about 200 ppm by weight, more preferably less than 100 ppm by weight. The sulphur content is below 1000 ppm by weight, preferably less than 500 ppm, more preferably less than 200 ppm by weight. The quantity of metals in the feed, such as Ni or V, is extremely low, i.e., less than 50 ppm by weight, preferably less than 10 ppm by weight and more preferably less than 2 ppm by weight.

The compounds obtained using the process of the invention may contain single-branched, two-branched and multi-branched compounds, advantageously with methyl groups.

EXAMPLES

The following examples illustrate the invention without limiting its scope.

Example 1
Preparation of catalyst C1 in accordance with the invention

The starting material was a NU-85 zeolite prepared in accordance with Example 4 of EP-A2-0 462 745, with a global Si/Al atomic ratio of 13.1, and a Na/Al atomic ratio of 0.23.

This NU-85 zeolite first underwent dry calcining at 550° C. in a stream of dry air for 20 hours. The solid obtained underwent four ion exchange steps in a solution of 10 N $NH_4NO_3$ at about 100° C. for 4 hours for each exchange step. The solid obtained was designated as $NH_4$-NU-85/1 and had an Si/Al ratio of 13.6 and an Na/Al ratio of 0.005. The remaining physico-chemical characteristic are shown in Table 1.

TABLE 1

| Sample | Adsorption | |
|---|---|---|
| | $S_{BET}$ (m²/g) | V(P/P$_0$ = 0.19) ml liquid $N_2$/g |
| $NH_4$-NU-85/1 | 438 | 0.18 |

The $NH_4$-NU-85/1 zeolite was mixed with SB3 type alumina from Condéa. The mixed paste was extruded through a 1.4 mm die. The extrudates were then calcined at 500° C. for 2 hours in air then dry impregnated with a solution of platinum tetramine chloride $[Pt(NH_3)_4]Cl_2$, and finally calcined in air at 550° C. The platinum content in the final catalyst C1 was 0.7% by weight and the zeolite content, expressed with respect to the ensemble of the catalyst mass, was 20% by weight.

Example 2
Preparation of catalyst C2 in accordance with the invention

The starting material was a NU-85 zeolite prepared in accordance with Example 4 of EP-A2-0 462 745 with a global Si/Al atomic ratio of 13.1, and a Na/Al atomic ratio of 0.23.

This NU-85 zeolite first underwent dry calcining at 550° C. in a stream of dry air for 18 hours. The solid obtained underwent four ion exchange steps in a solution of 10 N $NH_4NO_3$ at about 100° C. for 4 hours for each exchange step. The solid obtained then underwent treatment with a 6 N nitric acid solution under reflux for about 4 hours. The volume V of the nitric acid solution used (in ml) was 10 times the weight W of the dry NU-85 zeolite (V/W=10).

At the end of these treatments, the zeolite obtained was designated as NU-85/2 and had an Si/Al ratio of 29.6 and an Na/Al ratio of 0.002. The remaining physico-chemical characteristics are shown in Table 2.

TABLE 2

| Sample | Adsorption | |
|---|---|---|
| | $S_{BET}$ (m²/g) | V(P/P$_0$ = 0.19) ml liquid $N_2$/g |
| NU-85/2 | 416 | 0.17 |

The NU-85/2 obtained then underwent ion exchange using a solution of platinum tetramine chloride $[Pt(NH_3)_4]Cl_2$ using the following protocol. The $NH_4$-NU-85/2 was suspended in an ammonium nitrate solution such that the molar ratio $R=[NH_4^+]/2*[Pt(NH_3)_4]Cl_2$ was 20. The quantity of $[Pt(NH_3)_4]Cl_2$ complex introduced was such that the metallic platinum content (Pt) on the dry zeolite was 0.9%.

The Pt/$NH_4$-NU-85/2 zeolite prepared was mixed with SB3 type alumina from Condéa. The mixed paste was extruded through a 1.4 mm die. The extrudates were then calcined at 550° C. for 4 hours in air. The extrudates were then calcined in air at 550° C. for 4 hours. The platinum content in the final catalyst C2 was 0.18% by weight and the zeolite content, expressed with respect to the ensemble of the catalyst mass, was 20% by weight.

Example 3
Evaluation of catalysts C1 and C2 on a hydrocracking residue

Catalysts C1 and C2 were evaluated by treating a hydrocracking residue from a vacuum distillate.

The feed had the following characteristics:

| | |
|---|---|
| Sulphur content (ppm by weight) | 13 |
| Nitrogen content (ppm by weight) | 2 |
| Pour point (° C.) | +34 |
| Initial boiling point | 285 |
| 10% | 339 |
| 50% | 416 |
| 90% | 467 |
| End point | 522 |

Catalysts C1 and C2 prepared as described above in Examples 1 and 2 were used to prepare a base stock from the feed described above.

The catalyst had been reduced, in situ in the reactor, in hydrogen at 450° C. before the catalytic test. This reduction was carried out in stages. It consisted of a stage at 150° C. for 2 hours, then an increase of the temperature to 450° C. at a rate of 1° C./min, then a stage of 2 hours at 450° C. During this reduction procedure, the hydrogen flow rate was 1000 liters of $H_2$ per liter of catalyst.

Catalyst C1 was tested at a temperature of 265° C. at a total pressure of 12 MPa, an hourly space velocity of 1.6 h$^{-1}$ and at a hydrogen flow rate of 1000 liters of $H_2$ per liter of feed. Catalyst C2 was tested at a temperature 280° C. at a total pressure of 12 MPa, an hourly space velocity of 1.6 h$^{-1}$ and a hydrogen flow rate of 1000 liters of $H_2$ per liter of feed.

The net conversions of 400$^-$ compounds (with a boiling point of less than 400° C.), the yields of base stocks and their characteristics are shown in the table below.

| | Catalyst C1 | Catalyst C2 |
|---|---|---|
| Viscosity index VI | 128 | 125 |
| Pour point | −14 | −17 |
| Oil yield (wt %) | 74 | 71 |

These examples show the importance of the process of the invention which can reduce the pour point of the initial feed, in the case of a hydrocracking residue, while retaining a high viscosity index (VI).

What is claimed is:

1. A catalyst containing Pt and Pd, and NU-85 zeolite comprising silicon and an element T which is Al, Fe, Ga or B, in which at least a portion of element T has been removed and in which the atomic ratio Si/T is at least 18.

2. A catalyst according to claim 1, in which Si/T is at least 20.

3. A catalyst according to claim 1, in which Si/T is at least 22.

4. A catalyst according to claim 1, in which Si/T is at most 600.

5. A catalyst according to claim 1, in which Si/T is at most 300.

6. A catalyst according to claim 1, in which T is aluminium (Al).

7. A process for preparing a catalyst according to claim 1, comprising treating an NU-85 zeolite using at least one solution of an acid and introducing Pt and Pd by ion-exchange in said acid treated Nu-85 zeolite.

8. A process of preparing a catalyst according to claim 1, comprising heat treating an NU-85 zeolite, acid treating the heat treated NU-85 zeolite using at least one solution of an acid, and introducing Pt and Pd by ion-exchange in said acid treated NU-85 zeolite.

9. A process of preparing a catalyst according to claim 1, comprising dealuminating an NU-85 zeolite obtained by synthesis by at least one heat treatment followed by at least one treatment using a chemical dealuminating compound and introducing Pt and Pd by ion-exchange in said dealuminated NU-85 zeolite.

10. A process according to claim 9, wherein the dealuminating compound is ammonium hexafluorosilicate, silicon tetrachloride, or ethylenediaminetetra-acetic acid, including its sodium and disodium form.

11. A catalyst obtained by the preparation process of claim 7.

12. A catalyst according to claim 1, comprising at least one matrix and 0.5% to 99.5% by weight of NU-85 zeolite with respect to the matrix+zeolite mixture.

13. A catalyst according to claim 1, further comprising at least one additional hydro-dehydrogenating element.

14. A catalyst according to claim 13, in which the additional hydro-dehydrogenating element is a noble group VIII element.

15. A catalyst according to claim 13, in which the additional hydro-dehydrogenating element is at least one group VI metal or compound.

16. A catalyst according to claim 15, containing phosphorous.

17. A method for converting hydrocarbons comprising contacting a hydrocarbon feed with the catalyst of claim 1 under hydrocarbon conversion conditions.

* * * * *